United States Patent [19]
Lee

[11] Patent Number: 5,784,140
[45] Date of Patent: Jul. 21, 1998

[54] ANTI-FERROELECTRIC LIQUID CRYSTAL DISPLAY WITH TWISTED DIRECTOR AND PERPENDICULAR SMECTIC LAYERS

[75] Inventor: Sin-Doo Lee, Seoul, Rep. of Korea

[73] Assignee: Samsung Display Devices Co., Ltd., Kyungki-do, Rep. of Korea

[21] Appl. No.: 772,795

[22] Filed: Dec. 24, 1996

[30] Foreign Application Priority Data

Dec. 26, 1995 [KR] Rep. of Korea .............. 95-55949

[51] Int. Cl.$^6$ .............. G02F 1/141; G02F 1/1335; G02F 1/1337

[52] U.S. Cl. .............. 349/174; 349/100; 349/133

[58] Field of Search .............. 349/100, 172, 349/173, 174, 99, 133, 134

[56] References Cited

U.S. PATENT DOCUMENTS

| | | | |
|---|---|---|---|
| 5,046,823 | 9/1991 | Mori et al. | 349/174 |
| 5,078,477 | 1/1992 | Jono et al. | 349/174 |
| 5,172,257 | 12/1992 | Patel | 349/173 |
| 5,367,391 | 11/1994 | Johno et al. | 349/174 |
| 5,559,620 | 9/1996 | Tanaka et al. | 349/171 |
| 5,589,966 | 12/1996 | Hama et al. | 349/174 |
| 5,719,653 | 2/1998 | Minato et al. | 349/174 |

*Primary Examiner*—Hung X. Dang
*Assistant Examiner*—Tai V. Duong
*Attorney, Agent, or Firm*—Christie, Parker & Hale, LLP

[57] ABSTRACT

A liquid crystal display has a pair of transparent electrodes, an anti-ferroelectric liquid crystal therebetween, a polarizer and an analyzer attached to the electrodes. The smectic layers are perpendicular to the electrodes and the liquid crystal has a twisted structure. The directors on the surfaces on the two electrodes are symmetrically aligned with respect to the polarization axis of the polarizer so that the average optical axis of the liquid crystal coincides with the polarization axis of the polarizer. In absence of applied electric field, the incident light through the polarizer passes through the liquid crystal slab with maintaining its polarization. However, when an electric field is applied, the liquid crystal molecules experiences some degree of distortion and the average optical axis rotates. Therefore, the incident light passes through the liquid crystal slab with rotating the polarization.

13 Claims, 6 Drawing Sheets

ANTI-FERROELECTRIC LIQUID CRYSTAL DISPLAY WITH TWISTED DIRECTOR AND PERPENDICULAR SMECTIC LAYERS

BACKGROUND OF THE INVENTION

1. Field of the Invention

This invention relates to a liquid crystal display (hereinafter referred to as an LCD), in particular, to a liquid crystal display using an anti-ferroelectric liquid crystal with a twisted structure.

2. Description of the Related Art

A liquid crystal is a phase or a state different from both a crystal and a liquid in that it has only the orientational order or it has the orientational order and the positional order in part. Since a material in the liquid crystal phase has the orientational order and its molecules have asymmetrical shapes, it is called to be an anisotropic material having different physical properties due to its orientation. Typical liquid crystal molecules have the shapes of thin and long bars. The long axis of the molecule is called the molecular axis and the molecules tend to arrange themselves such that the molecular axes be parallel on average. The direction along the average molecular axis is represented as a "director".

The liquid crystals are classified by the type of order into three categories, i. e., nematic, cholesteric or chiral nematic and smectic liquid crystals. A nematic liquid crystal has an orientational order but has no positional order. A chiral nematic liquid crystal has intermolecular forces causing the average molecular axis to rotate in space along the direction perpendicular to the director. This property present in the chiral nematic liquid crystal is called "chirality". A smectic liquid crystal has a more ordered structure, formed into smectic layers, than the above two liquid crystals do. The smectic liquid crystal has not only the orientational order but also the positional order in part.

Among the smectic liquid crystals, tilted chiral smectic liquid crystals, for instance, smectic C* liquid crystals show ferroelectricity. Smectic C liquid crystals are those having the molecular axes tilted with respect to the layer normal. The molecules of the smectic C* liquid crystal have optical activity so that they form a helical structure along the layer normal. The smectic C* liquid crystal exhibits a spontaneous polarization in a direction perpendicular to the director and the layer normal. The smectic C liquid crystal has rotational symmetry with respect to the axis perpendicular to the director and inversion symmetry with respect to the surface of the smectic layer. However, if the molecule has a chiral part, the inversion symmetry is broken and the transverse dipole moment produces the spontaneous polarization in the smectic C* phase. The macroscopic spontaneous polarization averaged over one period or one pitch is zero since the molecules in the smectic C* phase are helically arranged along the layer normal. Thus, this ferroelectric liquid crystal is called as an improper ferroelectric material. The helical structure can be distorted under an external electric field and completely unwound above a critical field strength, thereby a macroscopic spontaneous polarization being induced.

On the other hand, there are different kinds of smectic C liquid crystals showing anti-ferroelectricity.

The behavior of the anti-ferroelectric liquid crystal is described with reference to FIG. 1.

The molecule of the anti-ferroelectric liquid crystal has a dipole P in a direction perpendicular to the director and the layer normal, and the molecules of the anti-ferroelectric liquid crystal in two adjacent smectic layers are slanted in opposite directions with respect to the layer normal. Therefore, the macroscopic spontaneous polarization is zero since the dipoles P in the two successive smectic layers are antiparallel, as shown in FIG. 1. Contrary to the ferroelectric liquid crystal, the anti-ferroelectric liquid crystal has electric dipole coupling forces between the adjacent smectic layers, and the coupling forces are much higher than the forces due to the anisotropy of the liquid crystal. Accordingly, when the force due to an externally applied electric field is less than the coupling force, the molecules do not respond to the electric field. However, the molecules tend to align along a direction such that the dipoles are aligned in the field direction, above the critical value for the field strength. Under these circumstances, the liquid crystal shows ferroelectricity, and this ferroelectricity is basically appeared by the electric field.

Now, a conventional LCD using an anti-ferroelectric liquid crystal is described with reference to FIGS. 2A to 2C.

An anti-ferroelectric liquid crystal is placed between two transparent electrodes 11 and 12. Smectic layers (not shown) of the liquid crystal are aligned perpendicular to the electrodes 11 and 12.

As shown in FIG. 2B, when no electric field is applied to the electrodes 11 and 12, the angle between the director and the axis perpendicular to the smectic layers is constant for fixed temperature and the molecules in two adjacent smectic layers are slanted oppositely with respect to the layer normal.

As shown in FIGS. 2A and 2C, when an electric field having a strength beyond the critical value is applied to the electrodes, the molecules are aligned along one of two directions depending on the polarity of the electric field. The molecular directions in the two cases are symmetrical with each other to the layer normal.

As a result, the anti-ferroelectric liquid crystal responds to the applied field in three states, i. e., ON, anti-ferroelectricity and OFF states, while a ferroelectric liquid crystal in two states, i. e., ON and OFF states.

This conventional anti-ferroelectric liquid crystal display (hereinafter referred to as an AFLCD) has several advantages such as low flicker and crosstalk, and improved viewing characteristics compared with a ferroelectric LCD.

However, the driving voltage is high since the applied field strength should be large enough to overcome the dipole coupling force. In addition, the conventional AFLCD has the problems such as poor gray scale and alignment.

SUMMARY OF THE INVENTION

An object of the present invention is to provide an LCD using an anti-ferroelectric liquid crystal having analogue gray scale in a uniformly aligned configuration.

In order to achieve the above object, the present invention uses an anti-ferroelectric liquid crystal between two transparent electrodes. The liquid crystal has smectic layers which are aligned perpendicular to the surfaces of the electrodes, and the molecular director is twisted on going from one electrode to the other. A twist angle between the directors defined on the surfaces of the two electrodes lies between zero degree and 180 degrees.

The molecules make a constant molecular tilt angle for fixed temperature with respect to the layer normal. The twist angle can be equal to or less than twice the molecular tilt angle, and preferably, is equal to twice the molecular tilt angle. In this case, the desirable materials are such anti-ferroelectric liquid crystals that have the molecular tilt angle to be 15 degrees to 60 degrees, especially from 40 degrees to 50 degrees. However, the twist angle from zero to 180 degrees is generally possible on going from one electrode to the other.

The pretilt angles on the two electrodes may be adjusted by proper surface alignment.

The liquid crystal display further comprises polarizers attached to the electrodes, respectively. The directors on the surfaces of the electrodes are symmetrically aligned with respect to the polarization axis of one of the polarizers. The polarization axes of the two polarizers are either parallel or perpendicular to each other.

Instead of using a pair of polarizers, it is possible to use a polarizer attached to the one electrode and a reflector attached to the other.

A compensation film may be attached to one of the electrodes.

The liquid crystal display uses a backlight or a natural light for a light source. When using the natural light, a reflector is attached to one of the electrodes.

In the absence of an applied electric field, the molecular director continuously moves on the surface of a cone due to the interaction of the force keeping the molecular tilt angle and the aligning force fixed for given temperature. In the presence of an applied electric field, the orientation of the molecular director varies in response to the electric field in such a way that the dipoles of the molecules are parallel to the electric field, and thus the gray representation is possible.

BRIEF DESCRIPTION OF THE DRAWINGS

The preferred embodiments of the present invention will now be described more specifically with reference to the attached drawings, wherein.

DETAIL DESCRIPTION OF THE PREFERRED EMBODIMENTS

The preferred embodiments of the present invention will become apparent from a study of the following detailed description, when viewed in light of the accompanying drawings.

Figure 1:
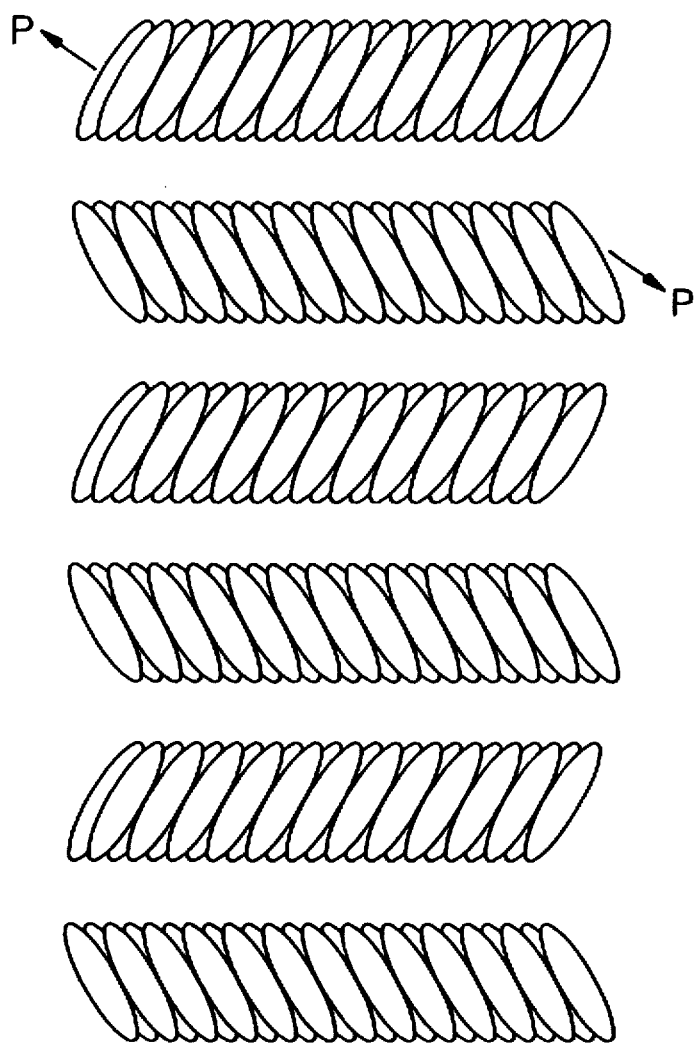
FIG. 1 illustrates molecules of an anti-ferroelectric liquid crystal display.
Figures 2A, 2B, 2C:
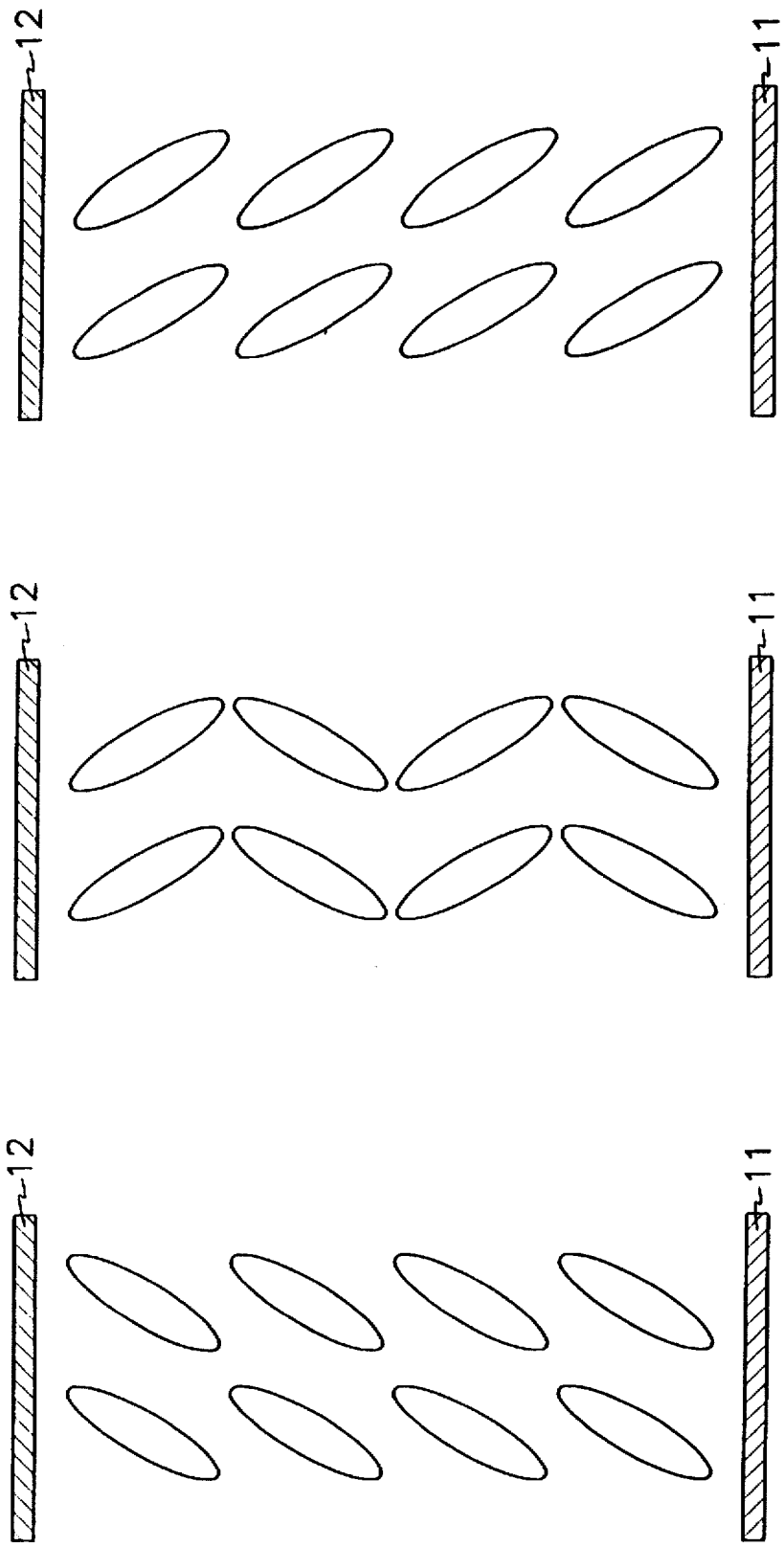
FIGS. 2A to 2C show molecules in successive smectic layers of a conventional anti-ferroelectric LCD.
Figure 3:
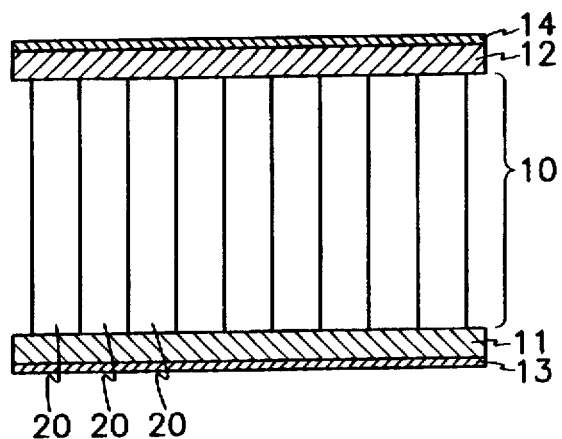
FIG. 3 shows an anti-ferroelectric LCD according to the embodiment of the present invention.

FIG. 3 shows an anti-ferroelectric LCD according to the embodiment of the present invention.

As shown in FIG. 3, an anti-ferroelectric liquid crystal 10 having either positive or negative dielectric anisotropy lies between two transparent electrodes 11 and 12. On outer surfaces of two electrodes 11 and 12, a polarizer 13 and an analyzer 14 are attached, respectively.

The smectic layers 20 of the liquid crystal 10 are perpendicular to the surface of the electrodes 11 and 12 and the molecular director of the liquid crystal 10 makes a fixed angle called a "molecular tilt angle" with respect to the layer normal.

The inner surface of each electrode 11 or 12 is coated with alignment layer (not shown) so that the molecular director of the liquid crystal 10 is aligned homogeneously. The alignment layer can be formed with, for example, surfactants such as alkylphenol and hexadecyltrimethylammonium bromide, polyimides, or alignment absorbants coated by the Langmuir-Blodgett film deposition method. The alignment layers are rubbed such that the molecular director of the liquid crystal 10 aligns along a certain direction.

The angle between the rubbing directions on two electrodes is twice the molecular tilt angle.

Then, the molecular director is arranged so that the force maintaining the molecular tilt angle and the dipole coupling force are balanced with the aligning force.

Figure 4A:
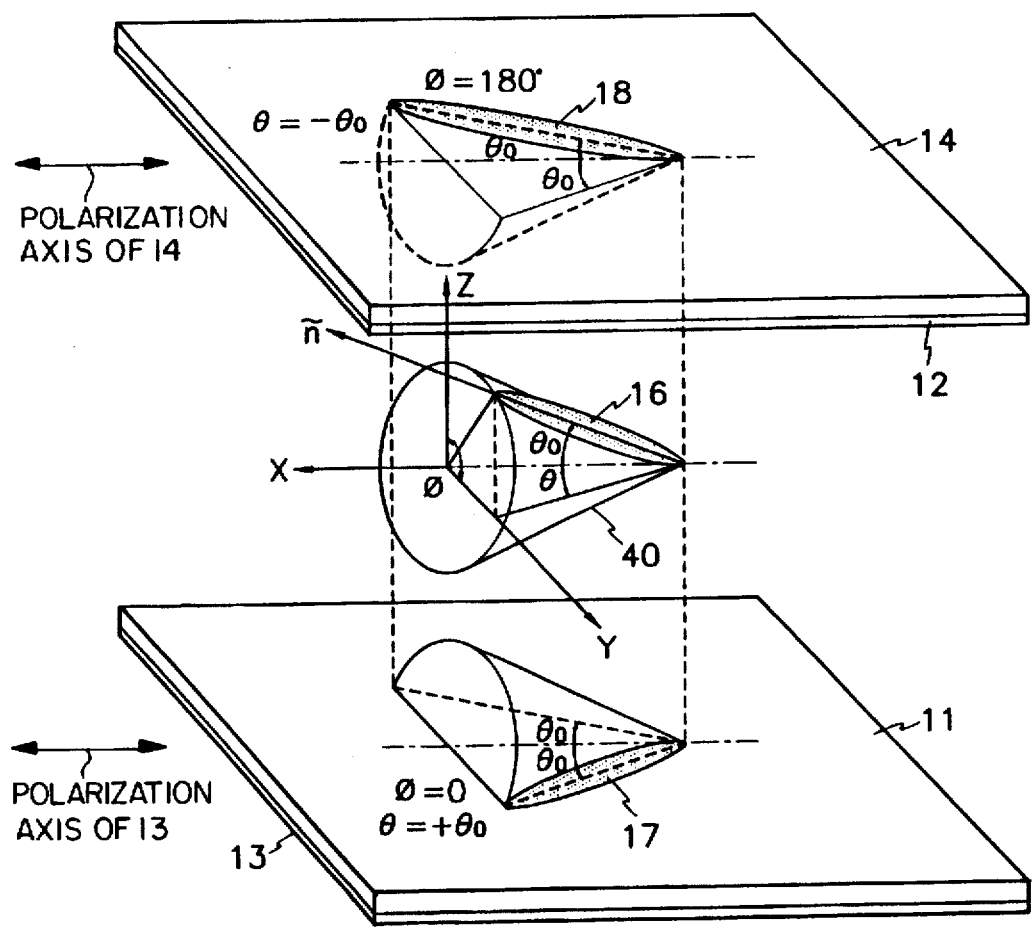
FIGS. 4A and 4B show the molecules in a smectic layer of an anti-ferroelectric LCD with parallel and crossed polarizers, respectively, according to the embodiment of the present invention.
Figure 4B:
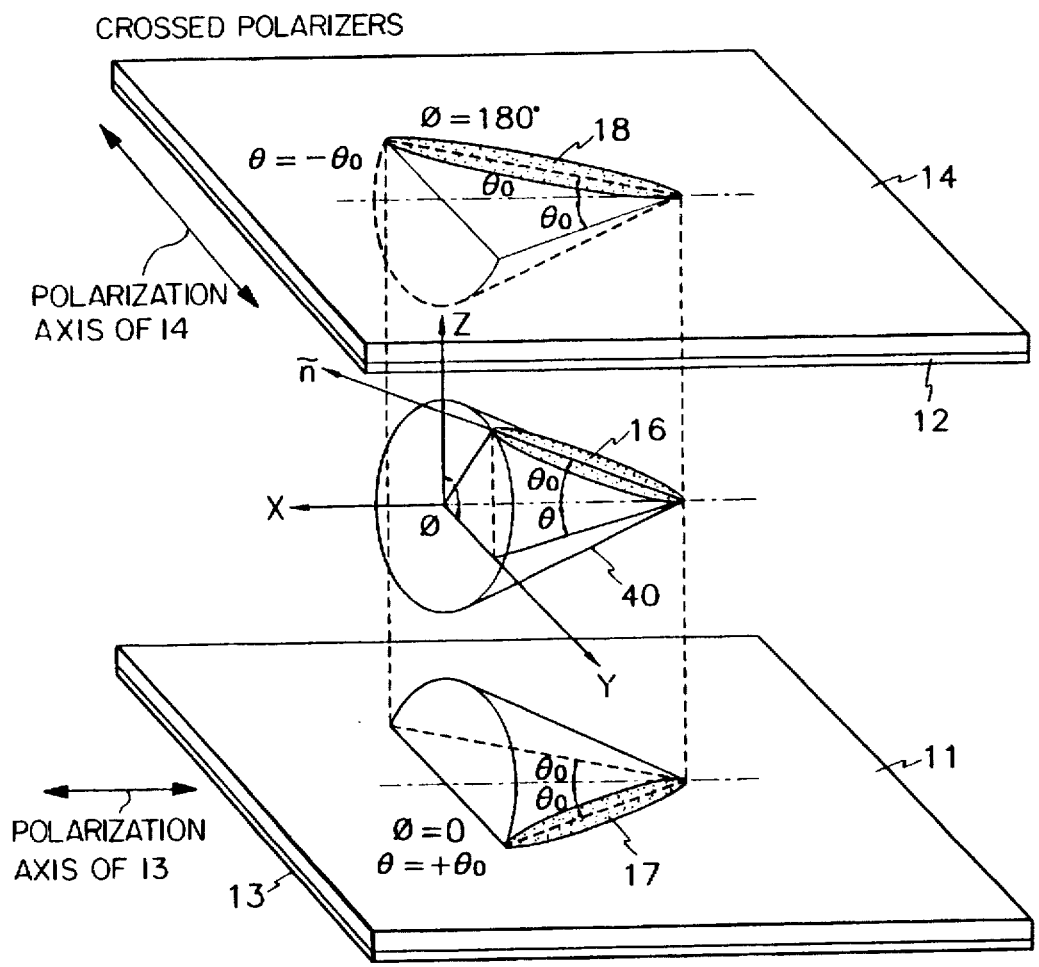
Figure 5:
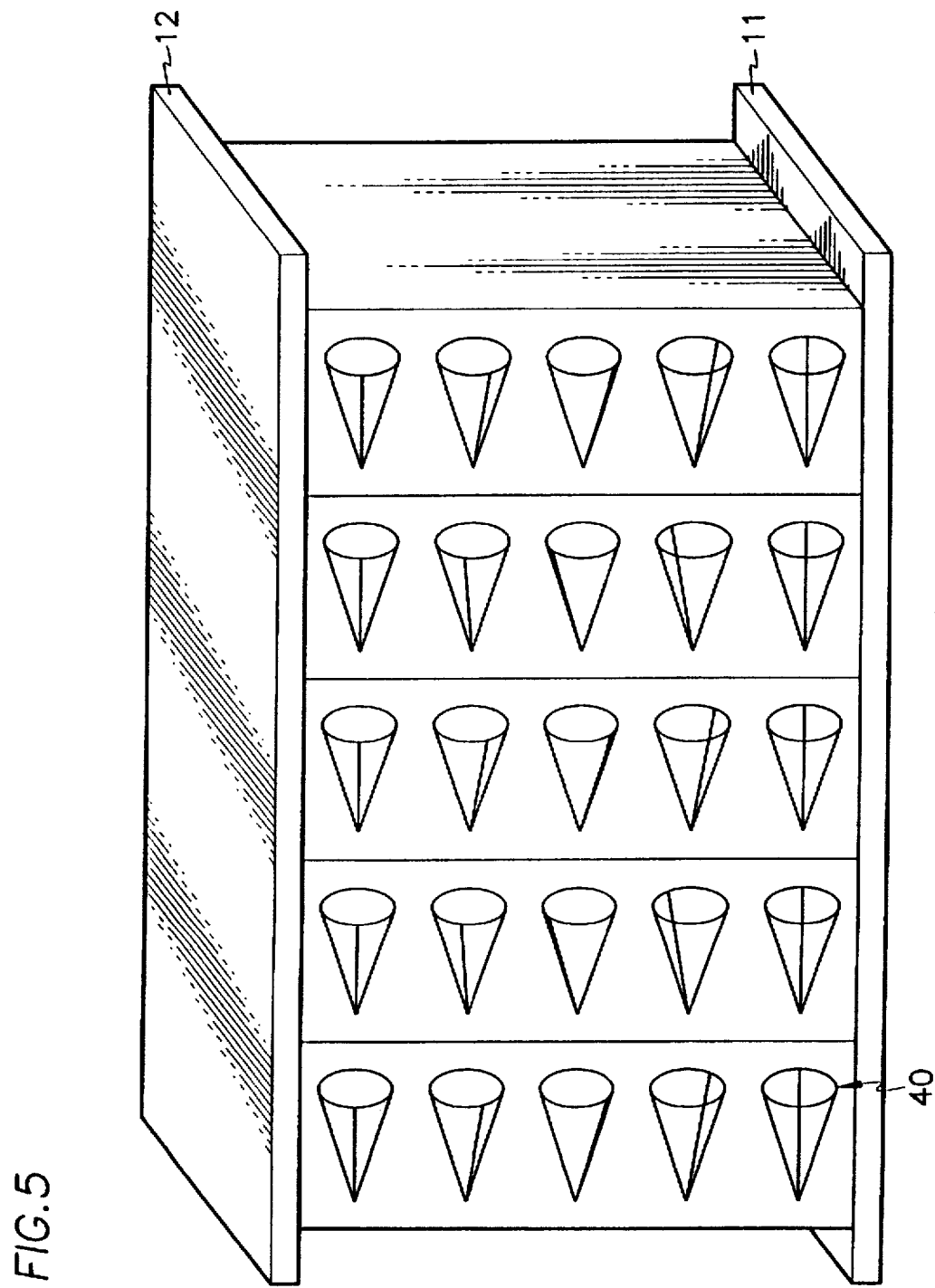
FIG. 5 shows the molecules in a plurality of smectic layers of an anti-ferroelectric LCD according to the embodiment of the present invention.

FIGS. 4 and 5 show the molecules in smectic layers of an anti-ferroelectric liquid crystal between the two electrodes 11 and 12.

Let x-axis be perpendicular to the smectic layer, y-axis be parallel to the electrodes 11 and 12, which makes 90 degrees with the positive x-axis counterclockwise, and z-axis is perpendicular to the x-y plane, which makes 90 degrees with the y-axis counterclockwise. And a "molecular tilt angle" $\Theta_0$ is defined as an angle between the positive x-axis and a molecular director $\bar{n}$, a "horizontal angle" $\Theta$ as an angle between the x-axis and the projected director onto the x-y plane, and a "rotational angle" $\phi$ as an angle between the y-axis and the projected director onto the y-z plane. Then the director $\bar{n}$ is represented as $\bar{n}=(\cos \Theta, \sin \Theta \cos \phi, \sin \Theta \sin \phi)$. Furthermore, assume that the horizontal angle $\Theta$ is positive when the projected director onto the x-y plane lies in the region where y>0, while negative when in the region where y<0.

The molecular tilt angle $\Theta_0$ (>0) is constant for fixed temperature due to the property of the anti-ferroelectric liquid crystal.

The plane spanned by the directors on the surface of the electrodes 11 and 12 are parallel to the surfaces of the electrodes 11 and 12 due to the homogeneous alignment. The rotational angle $\phi$ of the director on the lower electrode 11 is zero and that of the director on the upper electrode 12 is 180 degrees. The magnitudes of the horizontal angle $\Theta$ of the directors 17 and 18 are the same, while their signs being different. That is, the horizontal angle $\Theta$, of the director on the lower electrode 11 is equal to $+\Theta_0$, while that of the director on the upper electrode 12 to $-\Theta_0$.

The horizontal angle $\Theta$ in the bulk varies continuously from $+\Theta_0$ to $-\Theta_0$ through the liquid crystal slab.

As a result, the director is twisted by $2\Theta_0$ rotated on surface of a cone 40.

Therefore, the rotational angle $\phi$ in the region from the surface of the lower electrode 11 to the midpoint varies from zero to 90 degrees, and that in the region from the midpoint to the surface of the upper electrode 12 varies from 90 degrees to 180 degrees. Moreover, the horizontal angle $\Theta$ in the region from the surface of the lower electrode 11 to the midpoint varies from $+\Theta_0$ to zero, and that in the region from the midpoint to the surface of the upper electrode 12 varies from zero to $-\Theta_0$.

As a result, the difference in the rotational angle $\phi$ between the directors on the electrodes 11 and 12 is 180 degrees and the difference in the horizontal angle Θ is 2Θ₀, i.e., equal to the angle between the directors on the two electrodes 11 and 12.

FIG. 5 shows the molecules in smectic layers of an anti-ferroelectric liquid crystal between the two electrodes 11 and 12.

The molecules on the surfaces of the electrodes 11 and 12 in each smectic layer are aligned in a direction determined by the surface treatment. However, the molecules in the bulk tend to be arranged such that the molecules in two adjacent smectic layers are slanted oppositely with respect to the layer normal, keeping the molecular tilt angle fixed. Therefore, the molecules in the two smectic layers in the bulk rotate on the surface of the cone 40 in the opposite directions. So, the molecules near the midpoint in the two smectic layers lie on the opposite sides of the cone 40.

If the dipoles of the molecules on the surface of the upper electrode 12 are parallel to the direction pointing from the lower electrode 11 to the upper electrode 12, the dipoles at the midpoint lie along the direction perpendicular to the layer normal and parallel to the smectic layers. On the other hand, the dipoles on the lower electrode 11 are parallel to the direction pointing from the upper electrode 12 to the lower electrode 11.

In the presence of an applied electric field, the orientation of the molecules are distorted. Since each molecule of the anti-ferroelectric liquid crystal has an electric dipole perpendicular to the molecular axis and the dipole tends to be parallel to the applied field, the molecules arrange themselves such that they are perpendicular to the electric field, keeping the molecular tilt angle fixed.

Therefore, when an electric field across between the lower electrode 11 and the upper electrode 12 is applied, then the molecules tend to be arranged such that their dipoles are parallel to the electric field. Accordingly, the molecules rotate on the surface of the cone 40 to be arranged like the molecules on the upper electrode 12 shown in FIG. 5. However, since the molecules on the lower electrode 11 maintain their orientation, there exists a region between the surface of the lower electrode 11 and a certain plane where the molecules continuously rotate on the surface of the cone 40. On the contrary, when an electric field across between the upper electrode 12 and the lower electrode 11 is applied, the molecules rotate on the surface of the cone 40 to be arranged like the molecules on the lower electrode 11 shown in FIG. 5. Similarly, there exists a region between the surface of the upper electrode 12 and another plane where the molecules continuously rotate on the surface of the cone 40. Furthermore, molecular reorientation follows a minimal path from the initial state to the final, stable state.

Since the magnitude of the molecular rotation depends on the strength of the applied field, a continuous electro-optic effect is achieved as a function of the field strength.

Next, the operation of the LCD made up with an anti-ferroelectric liquid crystal according to the embodiment will be now described with reference to FIGS. 4 and 5.

Two directors on the surfaces of the electrodes 11 and 12 are symmetrical with respect to the polarization axis of the polarizer 13, and the polarization axes of the polarizer 13 and the analyzer 14 are perpendicular to each other, as shown in FIG. 4B. For example, the polarization axis of the polarizer 13 is parallel to x-axis shown in FIG. 4.

In absence of an electric field, the polarization axis of the polarizer 13 coincides with the average optical axis of the liquid crystal since the director maintains the twisted state along the cone. Assume that a linearly polarized light through the polarizer 13 is incident vertically on the electrode 11 along the surface normal. Then, the light passes through the liquid crystal slab with maintaining its polarization parallel to the average optical axis. Since the polarization axes of the polarizer 13 and the analyzer 14 are perpendicular to each other, the polarization of the light reaching at the analyzer 14 is perpendicular to that of the analyzer 14 and thus the light cannot pass through the analyzer 14. However, if the polarization axes of the analyzer 14 and the polarizer 13 are parallel to each other, as shown in FIG. 4A, the polarization of the light reaching at the analyzer 14 is parallel to that of the analyzer 14 and thus the light passes through the analyzer 14.

When an electric field is applied to the liquid crystal, the molecules tend to orient such that their molecular dipoles are parallel to the field direction on the surface of the cone 40. As described above, since there is a region where the molecules continuously rotate on the surface of the cone 40, the average optical axis of the liquid crystal rotates. The dimension of such a region and hence the magnitude of the average optical axis rotation are determined by the field strength.

Therefore, a linearly polarized light through the polarizer 13 reaches at the analyzer 14 with rotating its polarization by the amount of the average optical axis rotation, and partially passes through the analyzer 14. It is noted that the transmittance of the light does not depend on the direction of the electric field since the directors on the surfaces of the two electrodes 11 and 12 are symmetrically aligned with respect to the polarization axis of the polarizer 11.

As described above, an anti-ferroelectric LCD according to this embodiment has homogeneous alignment and the twist angle is twice the molecular tilt angle. Furthermore, the polarization axes of the polarizer and the analyzer are perpendicular to each other. However, the twist angle, the pretilt angle, the angle between the polarization axes of the polarizer and the analyzer, etc. are adjustable for optimum performance.

Figure 6:
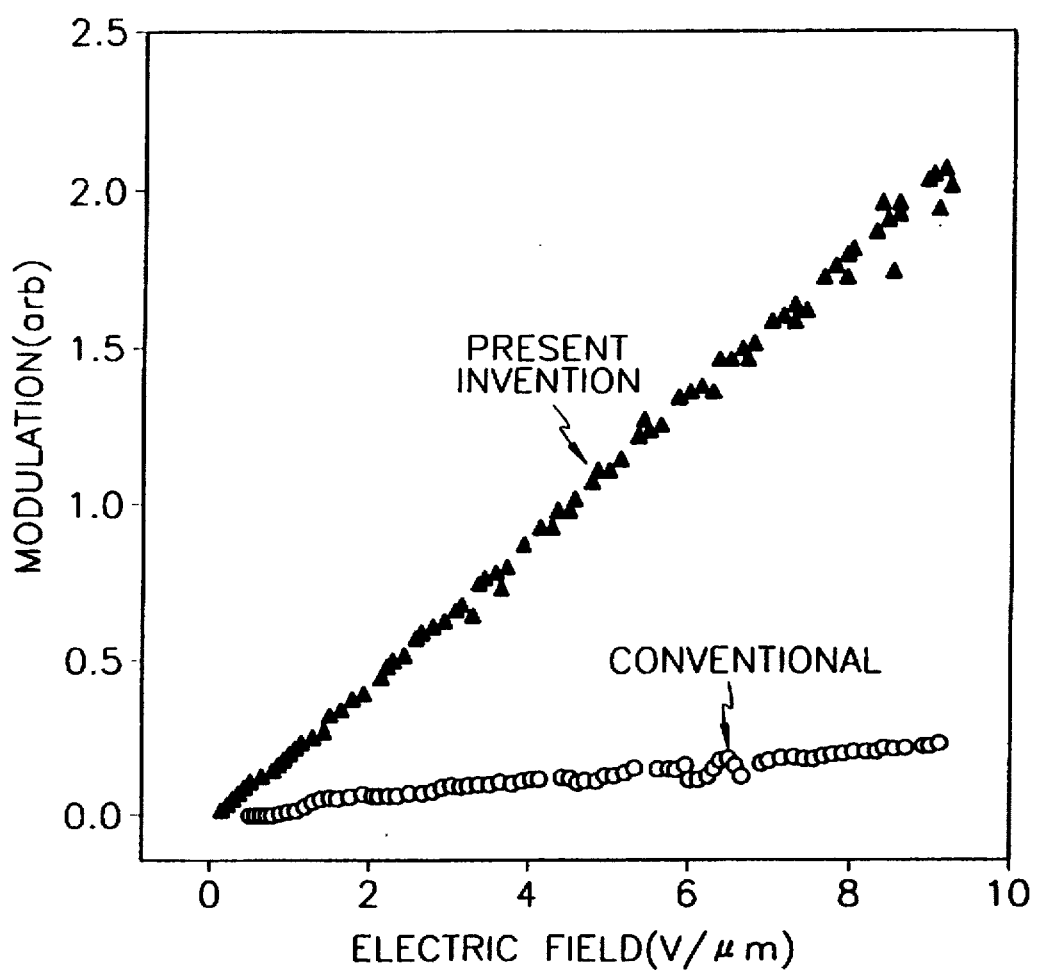
FIG. 6 is a diagram showing the modulation of light through the LCD as a function of applied voltage in the anti-ferroelectric LCD according to the present invention.

FIG. 6 shows the electro-optic modulation as a function of applied field strength for a AFLCD according to this embodiment as well as the conventional AFLCD. Since the modulation of the present invention is about seven times that of the conventional art as shown in FIG. 6, low voltage driving, gray scale capability and hight contrast are possible.

As described above, the present invention uses an anti-ferroelectric liquid crystal having a twisted structure and realizes a continuous electro-optic effect, low voltage driving, high contrast and large area uniform alignment.

It is understood that various other modifications will be apparent to and can be readily made by those skilled in the art without departing from the scope and spirit of the present invention. Accordingly, it is not intended that the scope of the claims append hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A liquid crystal display comprising:
   a first transparent electrode;
   a second transparent electrode; and
   an anti-ferroelectric C liquid crystal disposed between the first and the second electrodes, the liquid crystal having a plurality of smectic layers perpendicular to the first and the second electrodes, a molecular director which twists on going from the first electrode to the second electrode, and molecules in two adjacent smectic layers which rotate in bulk in opposite directions with respect to a layer normal to the smectic layers.

2. The liquid crystal display according to claim 1 wherein the molecular director on a surface of the first electrode and the molecular director on a surface of the second electrode are homogeneously aligned.

3. The liquid crystal display according to claim 2 wherein the molecular director on the surface of the first electrode is rotated relative to the molecular director on the surface of the second electrode to make a twist angle substantially in the range of zero degrees to 180 degrees.

4. The liquid crystal display according to claim 3 wherein the molecular director makes a molecular tilt angle with respect to a layer normal to the smectic layers.

5. The liquid crystal display according to claim 4 wherein the twist angle is substantially equal to or less than twice the molecular tilt angle.

6. The liquid crystal display according to claim 5 wherein the twist angle is substantially equal to twice the molecular tilt angle.

7. The liquid crystal display according to claim 6 wherein the molecular tilt angle is substantially in the range of 15 degrees to 60 degrees.

8. The liquid crystal display according to claim 1 further comprising a first polarizer attached to the first electrode and a second polarizer attached to the second electrode, each of the first and the second polarizers having a polarization axis.

9. The liquid crystal display according to claim 8 wherein the polarization axes of the first and second polarizers are substantially perpendicular to each other.

10. The liquid crystal display according to claim 8 wherein the polarization axes of the first and second polarizers are substantially parallel to each other.

11. The liquid crystal display according to claim 8 wherein the molecular director on a surface of the first electrode and the molecular director on a surface of the second electrode are symmetrically aligned with respect to the polarization axis of one of the first and second polarizers.

12. The liquid crystal display according to claim 11 wherein the polarization axes of the first and second polarizers are substantially perpendicular to each other.

13. The liquid crystal display according to claim 11 wherein the polarization axes of the first and second polarizers are substantially parallel to each other.

* * * * *

UNITED STATES PATENT AND TRADEMARK OFFICE
CERTIFICATE OF CORRECTION

PATENT NO. : 5,784,140
DATED : July 21, 1998
INVENTOR(S) : Sin-Doo Lee

It is certified that error appears in the above-identified patent and that said Letters Patent is hereby corrected as shown below:

Column 3, line 54, change "DETAIL" to -- DETAILED --.
Column 6, line 44, change "hight" to -- light --.

Signed and Sealed this

Thirteenth Day of July, 1999

Attest:

Attesting Officer

Q. TODD DICKINSON

Acting Commissioner of Patents and Trademarks